US008261284B2

(12) United States Patent
Loeser (10) Patent No.: US 8,261,284 B2
(45) Date of Patent: Sep. 4, 2012

(54) FAST CONTEXT SWITCHING USING VIRTUAL CPUS

(75) Inventor: Jork Loeser, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1360 days.

(21) Appl. No.: 11/854,833

(22) Filed: Sep. 13, 2007

(65) Prior Publication Data

US 2009/0077564 A1    Mar. 19, 2009

(51) Int. Cl.
*G06F 9/46*    (2006.01)
(52) U.S. Cl. ........ 718/108; 710/260; 710/261; 710/262; 710/263; 710/264; 710/265; 710/266; 710/267; 710/268; 710/269; 712/228
(58) Field of Classification Search .................. None
See application file for complete search history.

(56) References Cited

U.S. PATENT DOCUMENTS

| | | | |
|---|---|---|---|
| 6,247,040 B1 | 6/2001 | Born et al. | |
| 6,292,888 B1* | 9/2001 | Nemirovsky et al. | 712/225 |
| 6,507,862 B1 | 1/2003 | Joy et al. | |
| 6,766,515 B1 | 7/2004 | Bitar et al. | |
| 7,185,185 B2 | 2/2007 | Joy et al. | |
| 7,424,712 B1* | 9/2008 | Sistare et al. | 718/102 |
| 7,478,394 B1* | 1/2009 | de Dinechin et al. | 718/108 |
| 2003/0088604 A1 | 5/2003 | Kuck et al. | |
| 2004/0221290 A1* | 11/2004 | Casey et al. | 718/104 |
| 2005/0132364 A1* | 6/2005 | Tewari et al. | 718/1 |
| 2005/0240819 A1* | 10/2005 | Bennett et al. | 714/34 |
| 2005/0262181 A1 | 11/2005 | Schmidt et al. | |
| 2006/0005190 A1* | 1/2006 | Vega et al. | 718/1 |
| 2006/0259731 A1 | 11/2006 | Oshins et al. | |
| 2007/0005898 A1* | 1/2007 | Halleck et al. | 711/129 |
| 2007/0006228 A1 | 1/2007 | Grobman et al. | |
| 2007/0028244 A1 | 2/2007 | Landis et al. | |
| 2007/0050767 A1* | 3/2007 | Grobman et al. | 718/1 |
| 2007/0079301 A1 | 4/2007 | Chinya et al. | |

OTHER PUBLICATIONS

Wang, et al., "Helper Threads via Virtual Multithreading on an Experimental Itanium 2 Processor-based Platform", ASPLOS'04, Oct. 9-13, 2004, ACM, 2004, pp. 144-155.
Redstone, et al., "Mini-threads: Increasing TLP on Small-Scale SMT Processors", In Proceedings of the Ninth International Symposium on High Performance Computer Architecture (HPCA-9), Feb. 2003, pp. 1-12.

* cited by examiner

*Primary Examiner* — Emerson Puente
*Assistant Examiner* — Sisley Kim
(74) *Attorney, Agent, or Firm* — Woodcock Washburn LLP (57) ABSTRACT

Various technologies and techniques are disclosed that provide fast context switching. One embodiment provides a method for a context switch comprising preloading a host virtual machine context in a first portion of a processor, operating a guest virtual machine in a second portion of the processor, writing parameters of the host virtual machine context to a memory location shared by the host virtual machine and the guest virtual machine, and operating the host virtual machine in the processor. In this manner, a fast context switch may be accomplished by preloading the new context in a virtual processor, thus reducing the delay to switch to the new context.

20 Claims, 6 Drawing Sheets

FAST CONTEXT SWITCHING USING VIRTUAL CPUS

BACKGROUND

Computer processors execute multiple tasks very quickly by dividing execution cycles between different threads of executable code. This is often called multithreading. In addition, hyperthreaded processor cores may have extra circuitry to emulate multiple processors by having extra sets of registers but using the execution units of a single processor. Recently, multiple core processors have been introduced that have entire processors co-located on the same silicon integrated circuit. These approaches may also be combined in a multi-core processor where each core is hyperthreaded.

To multithread, a processor undergoes a context switch. One example context is a processor state including the contents of registers and a program counter. A context switch involves halting the progression of a first process and storing the context for that process in memory. Then, the processor retrieves a context of a second process from memory, loads it in the registers, and loads the memory address in the program counter corresponding to the second process.

Example context switches include user level to system level switches, often called system calls, context switches between virtual machines, and context switches due to interrupt service routines. Although context switches allow a processor to schedule multiple threads, a portion of the processing budget must be dedicated to saving and loading the processor state. Hardware costs for system call context switches may be hundreds of processor cycles, for virtual machine context switches thousands of cycles, and for interrupt context switches (exceptions), hundreds to a few thousand cycles. Software costs for a context switch also depend on the type of context switch and may also be non-trivial.

SUMMARY

Accordingly, a method for fast context switching is described below in the Detailed Description. For example, one disclosed embodiment provides a method for context switching that comprises operating a guest virtual machine in a first portion of a processor, preloading a host virtual machine context in a second portion of the processor, writing parameters of the host virtual machine context to a memory location shared by the host virtual machine and the guest virtual machine, and operating the host virtual machine in the processor. In this manner, a fast context switch may be accomplished by preloading the new context in a virtual processor, thus reducing the delay to switch to the new context. Other embodiments are described involving a system call and interrupt service routine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
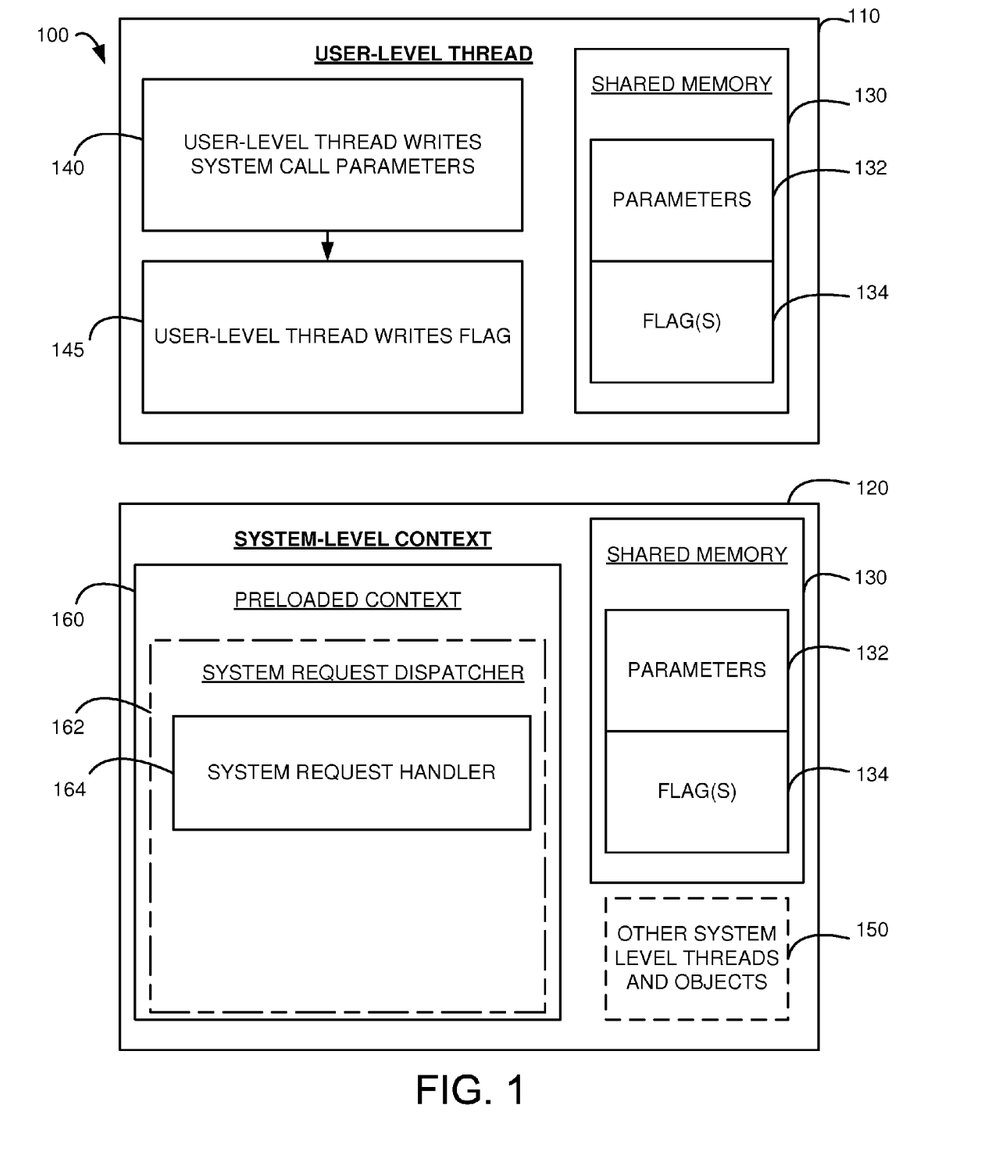
FIG. 1 shows a block diagram of an embodiment of a system call environment for a fast context switch.

Various embodiments of fast context switching are described below. First, FIG. 1 shows a block diagram of fast context switching in the context of a system call. In this embodiment, a system-level context is pre-loaded in a set of registers on another processor, a virtual processor, etc. to allow a fast context switch during a system call from a user-level thread. Specific examples of contexts that may be pre-loaded include, but are not limited to, a system level handler, a signaling handler within a virtual machine, or an interrupt service handler. Utilizing a pre-loaded context thus allows hardware to switch the new context without having to wait for the clearing and loading of the new context.

Continuing with FIG. 1, a user-level thread 110 comprises a shared memory location 130 that may contain parameters 132, flags, 134, etc. Shared memory is also accessible and monitored by a system-level context 120. Thus, user-level thread 110 may write system call parameters to shared memory 130 in parameter location 132, as illustrated in block 140. Then, in block 145, the user-level thread writes a flag to flag location 134, to activate the system-level context 120. In some embodiments, data or instructions other than parameters 132 or flag 134 may be used to activate the system-level context 120.

Upon loading of parameters 132 and flag 134 in shared memory location 130, the system-level context may begin a preloaded context 160 by a dispatcher waking up 162, followed by the dispatcher executing a system request 164 as instructed in shared memory 130. Some embodiments may utilize further system-level threads and objects 150 after the context switch from user-level thread 140. Similarly, a user-level thread 110 may utilize the same shared memory mechanism when waiting for the end of a system call when the processor undergoes a context switch back to the user-level thread 110.

Further, some embodiments may use a generic hardware mechanism comprising multiple preloaded contexts to allow fast context switching to arbitrary contexts more effectively, as scheduling/context save/context restore code for a context switch may not be necessary at runtime if a context is preloaded.

Some embodiments may utilize a virtual CPU, sometimes called hyperthreads, such as those found in Intel x86 processors with hyperthreading support. Hyperthreads are a cost-effective way of providing further full CPU contexts without the additional hardware cost or energy cost of a complete CPU or CPU core. In a processor with one core and two hyperthreads, the system-level context may be pre-loaded on one hyperthread while the user-level context executes on the other hyper-thread.

Upon loading the system-level context 120, the system-level context 120 may wait for activation in any suitable manner. For example, the handlers mentioned above (system level handler, a signaling handler within a virtual machine, or an interrupt service handler), may initially wait for the context switch in a spin-lock on a memory location ("spinning") shared with a user-level thread 110. To signal, the user-level thread may set this memory location to a specific signaled state, thereby waking up the dispatcher 162 to execute the system request 164. Alternatively, the handlers could use an instruction which places a currently running (virtual) processor to a non-sleep waiting state until a previously selected memory location is written to. An example of such an instruction is the MWait instruction for Intel X86 processors, available from the Intel Corporation of Santa Clara, Calif. In some embodiments, if the user-level thread 110 needs to wait for the completion of a system request, the user-level thread 110 may be placed in a waiting condition using the same approach. Alternatively, a user-level thread 110 may execute further instructions while waiting for a result from a system call 120.

Figure 2:
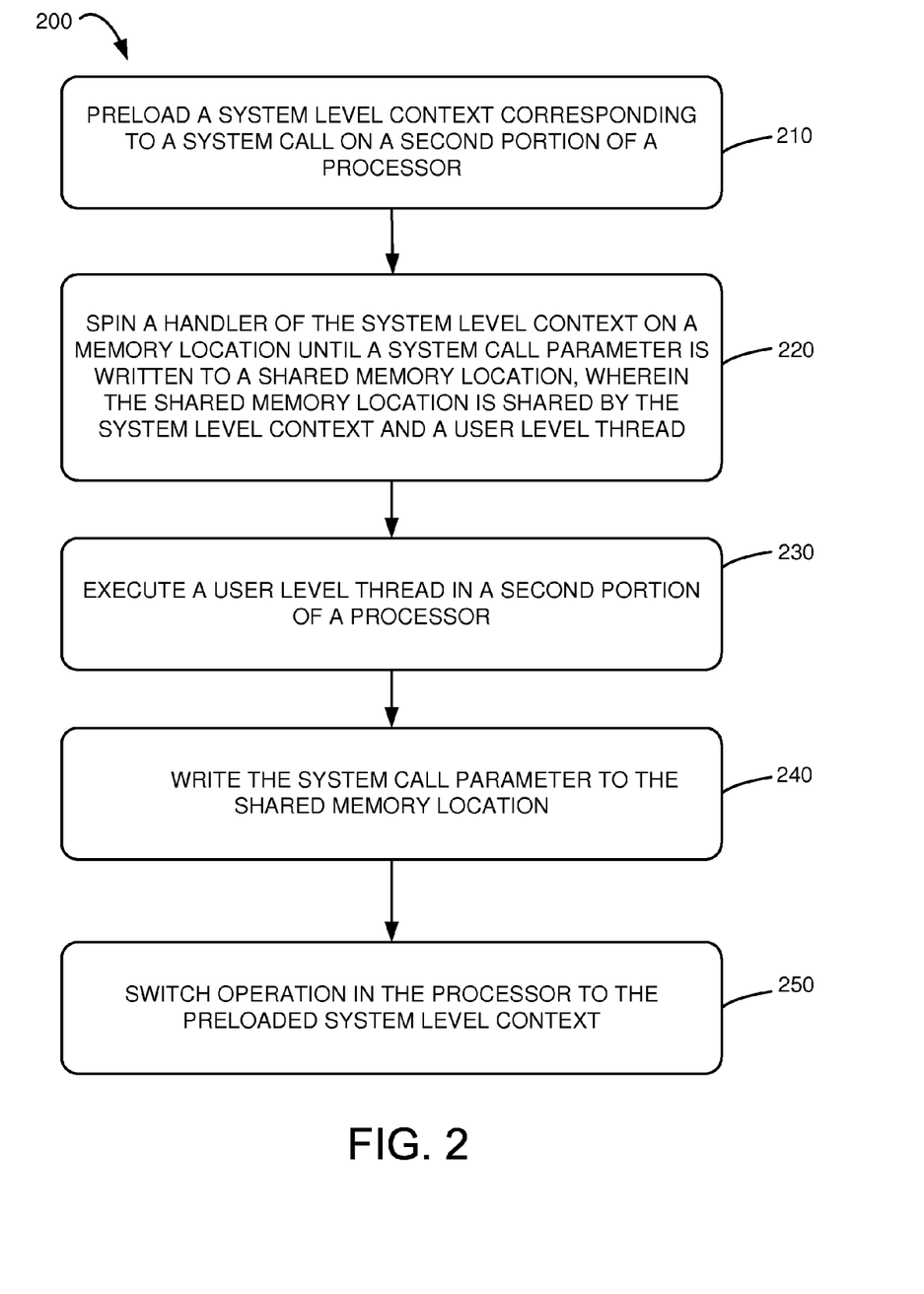
FIG. 2 shows a process flow depicting an embodiment of a method for utilizing a fast context switch in a system call environment.

FIG. 2 depicts an embodiment of a method for utilizing a fast context switch in a system call environment such as that shown in FIG. 1. Method 200 first comprises preloading a system-level context corresponding to a system call on a first portion of a processor in block 210. After preloading the system-level context, the system-level context, at block 220, spins a handler of the system level context on a memory location until a system call parameter is written to a shared memory location, wherein the shared memory location is shared by the system level context and a user level thread. Next, method 200 comprises executing a user-level thread in a second portion of a processor, as illustrated in block 230. Then, the user-level thread writes the system call parameter to the shared memory location, as illustrated in block 240. In block 250, method 200 then may switch operation of the processor to the preloaded system level context.

Additionally, some embodiments may undergo a switching operation in the processor from one user-level context to another user-level context without requiring a security-level switch. In this way, when the memory location is written to, the preloaded second user-level context may immediately begin.

Some embodiments may execute the user-level thread 110 and system context 120 with a hyperthread switch on the same physical processor. Such embodiments may allow a user-level thread and a system-level context to not compete for processor execution units. Other embodiments may comprise executing the user-level thread and the system context on separate processors or separate processor cores, etc.

Figure 3:
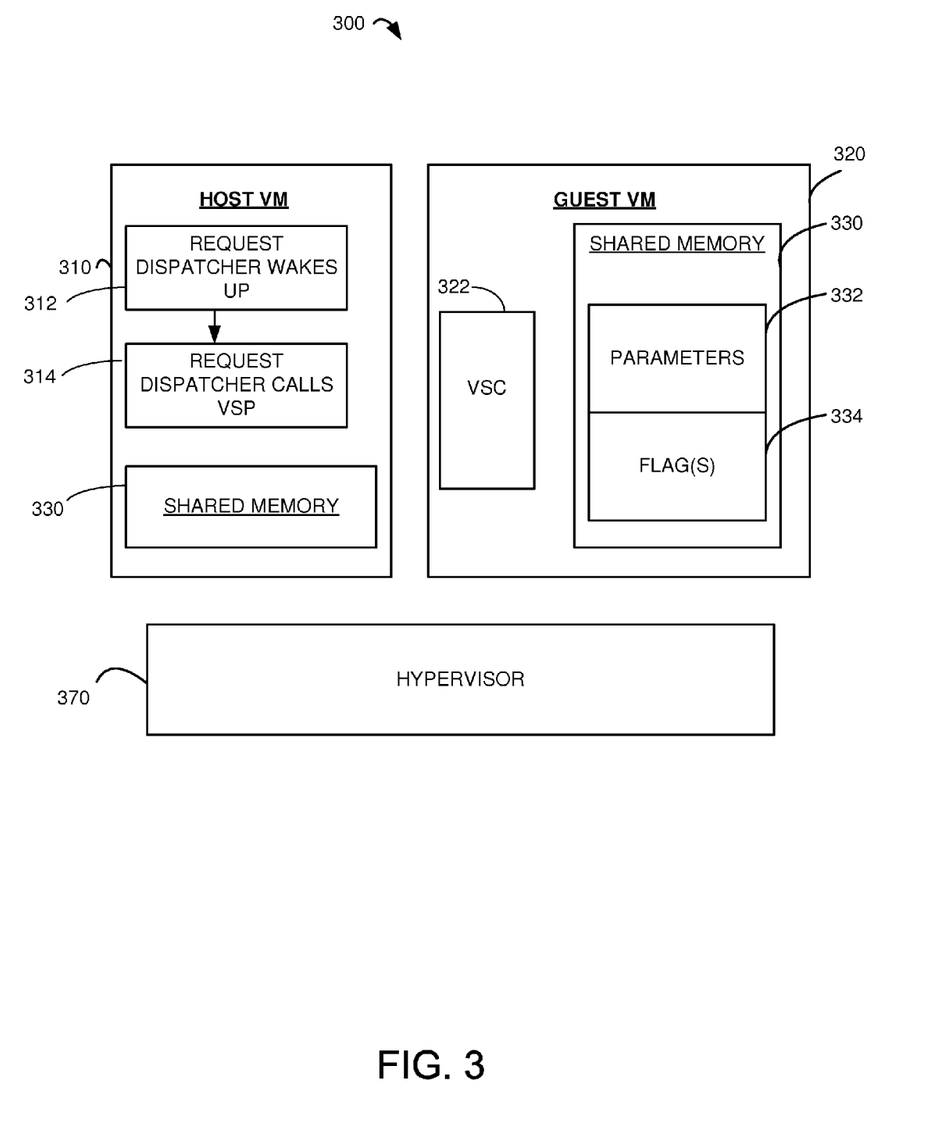
FIG. 3 shows a block diagram of an embodiment of an example virtual machine embodiment for a fast context switch.

Fast context switching as described above may also be used in environments other than context switches between user and system level. For example, FIG. 3 shows a block diagram 300 of fast context switching in the context of a context switch between virtual machines. It will be appreciated that the block diagram of FIG. 3 is shown for the purpose of example, and that other virtual machines may have different structures, pass different requests, data, or instructions using shared memory, and still be in accordance with the appended claims.

Guest virtual machine 320 is illustrated with a virtual service client (VSC) 322, and a shared memory 330 comprising a request parameter structure 332 and a flag 334. Host virtual machine 310 also comprises shared memory 330, as well as code to wake up a request dispatcher 312 and code for request dispatcher to call a virtual service provider (VSP). In one example, embodiment 300 may be used to send device requests from an enlightened/para-virtualized partition to a driver partition, or to send other requests to a virtual machine management partition.

Currently, a virtual machine, sometimes referred to as a VM, may use enlightened devices (also known as paravirtualized devices) for increased performance. Instead of emulating real devices to virtual machines and trapping all alleged device accesses, virtual machines may use specific enlightened drivers, such as virtual service clients (VSCs), that efficiently communicate with a virtual machine monitor (VMM). Typically, a VSC has a shared memory location established with the VMM. Whenever the VSC in the virtual machine wants to issue a device request, it may write parameters to the shared memory and then signal the VMM. This signaling typically requires the virtual machine to exit, switching to the VMM, and executing the request. Unfortunately, exiting a virtual machine may cause considerable overhead. In some virtualization products, the process may even be more costly. For example, sometimes a VMM is executed inside a virtual machine as well, so a context switch to that virtual machine is also needed.

Therefore, in some embodiments, a separate hardware context may be prepared at a host virtual machine and placed in a waiting condition to be ready to handle device requests from a virtual service client. When a VSC 322 in the guest virtual machine 320 issues a device request 332, it loads the corresponding parameters 332 to a memory location 330 shared with the VSP in the host virtual machine 310 and wakes up the prepared hardware context 312. The wake-up happens by the VSC writing to a previously defined memory location 330. In some embodiments, if the guest virtual machine 320 waits for the completion of a device request, it may place itself in a waiting state using a similar approach. Alternatively, a guest virtual machine 320 may execute further instructions while waiting for the response from the host virtual machine 310. In this manner, an embodiment may batch multiple device requests. Some embodiments may use a similar mechanism to issue non-device requests from a guest virtual machine 320 to a host virtual machine 310. Furthermore, in some embodiments may issue device requests and non-device requests from one guest virtual machine 320 to another guest virtual machine 320.

Figure 4:
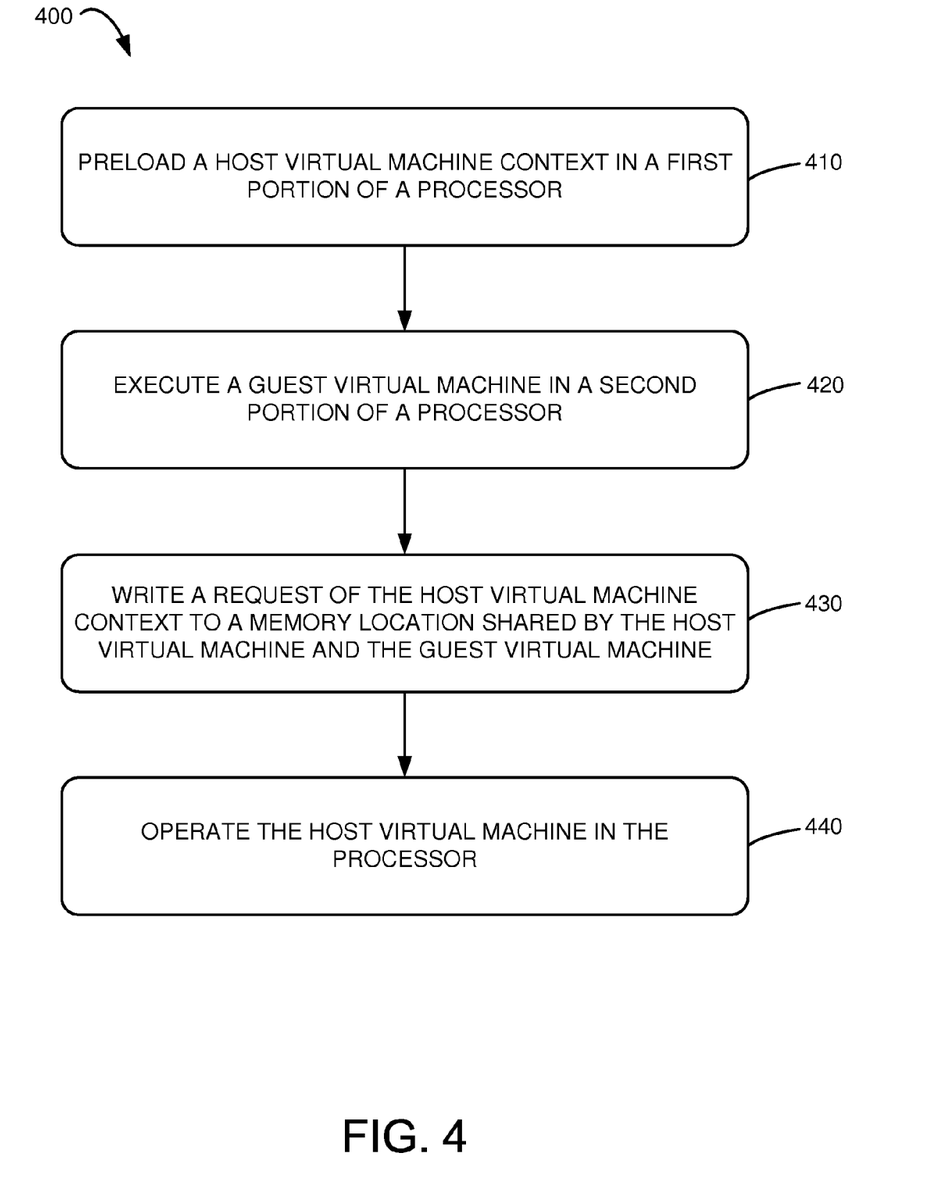
FIG. 4 shows a process flow depicting an embodiment of a method for utilizing a fast context switch in a virtual machine environment.

FIG. 4 shows a process flow depicting an embodiment of a method for utilizing a fast context switch in a virtual machine environment such as that shown in FIG. 3. Method 400 provides a virtual machine context switch by preloading a host virtual machine context in a first portion of a processor as illustrated in block 410. Next, method 400 executes a guest virtual machine in a second portion of a processor as illustrated in block 420. Next, method 400 writes a request of the host virtual machine context to a memory location shared by the host virtual machine and the guest virtual machine in block 430. In block 440, the method 400 then executes the host virtual machine in the processor.

Method 400 may be used in any suitable manner. For example, in some embodiments (and referring briefly back to FIG. 3), method 400 may comprise preloading a host virtual machine 310 context in a second portion of the processor and spin a handler of the host virtual machine 310 context on a memory location until the host virtual machine 310 request 332 is written to the shared memory location 330. Embodiments that utilize Intel x86 processors may use an MWait instruction in the host virtual machine 310 until the host virtual machine request is written to the memory location. More broadly, a host virtual machine 310 context may be preloaded in a second portion of the processor using a generic instruction that alerts the host virtual machine 310 that the host virtual machine 312 request 332 is written to the shared memory location 330.

In yet another embodiment, the request of the host virtual machine 310 may be a device request from an enlightened partition to a driver partition. In further embodiments, the request of the host virtual machine 310 may be a non-device request. Additionally, an embodiment may further comprise a context switch between two similar virtual machines, such as two guest virtual machines 320.

Figure 5:
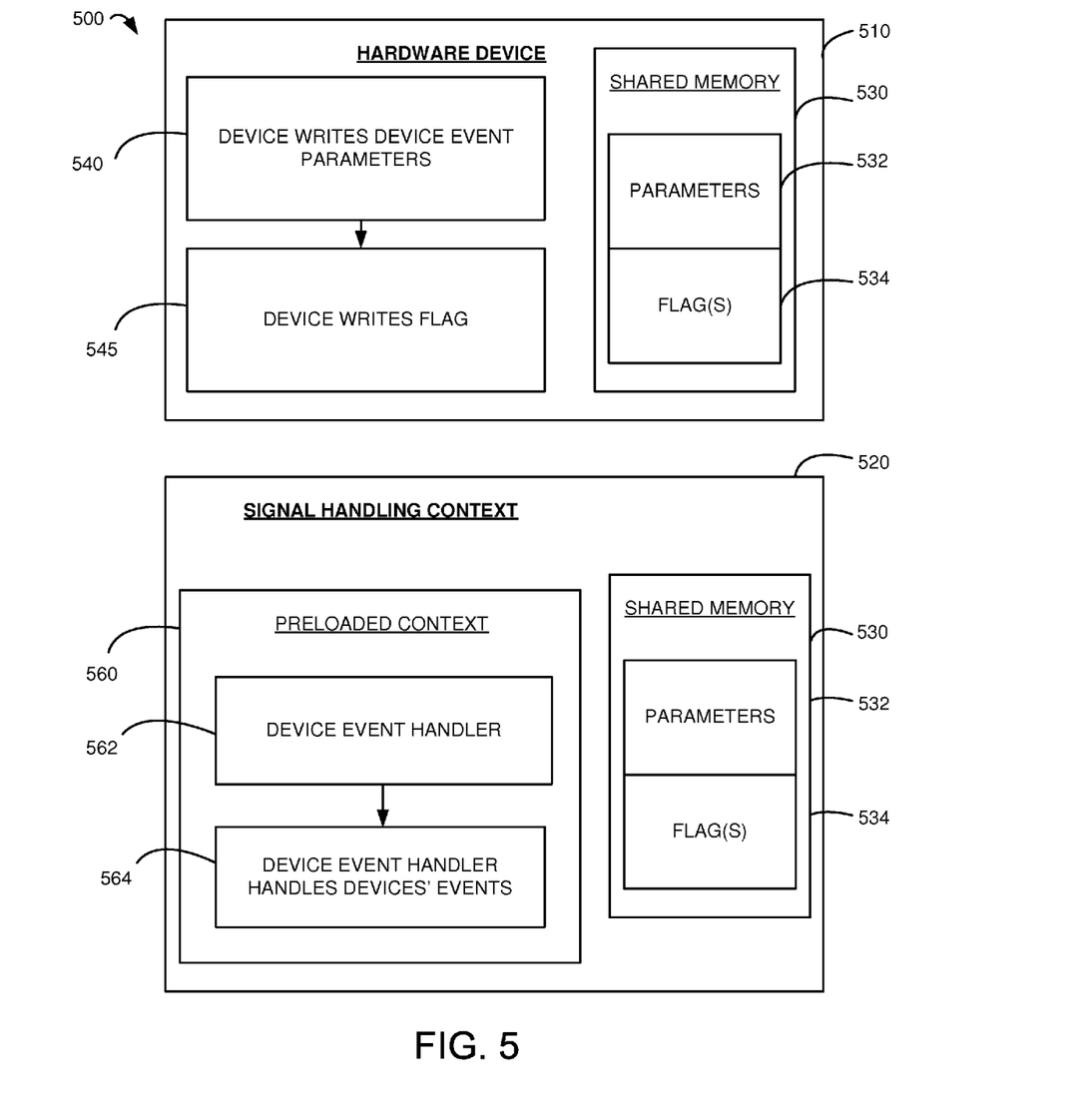
FIG. 5 shows a block diagram of an embodiment of a device interrupt environment for a fast context switch.

Continuing with the figures, FIG. 5 shows a block diagram of fast context switching in the context of a hardware device interrupt. Many devices signal various events using interrupts. Example events include the arrival of network packets, the successful transmission of network packets, the completion of a disk block read or write, error conditions, etc.

Such device interrupts can be expensive. For example, at the hardware layer, once a currently executed context is saved, a system-level switch is executed, and operation is continued using a dedicated interrupt service routine. At the software layer, this interrupt service routine does several checks and typically schedules an interrupt handler that finally handles the event. The handling of these interrupts can cause considerable overhead.

Embodiment 500 therefore utilizes a pre-loaded context to help make a device interrupt more efficient. Embodiment 500 comprises a hardware device 510 and a signal handling context 520, also called a device event handler. Hardware device 510 has access to a shared memory location 530, which may store parameters 532 and one or more flags 534. Additionally, hardware device 510 includes code to allow the hardware device to write event parameters 540 and to write a flag 545 to the shared memory location 530.

In a similar fashion to other embodiments described herein, upon some condition such as flag 534, signal handling context 520 may access the shared memory location 530 and begin a preloaded hardware context 560 by waking up an device event handler 562 and handling the event 564.

Continuing with FIG. 5, embodiment 500 utilizes a separate hardware context 560 that is prepared at a device event handler 562, waiting and ready to handle hardware device 510 events. When a hardware device 510 needs to signal an event, the hardware device 510 can load the desired parameters to a shared memory location 530 with the device event handler 562 and then may wake up the prepared hardware context. While the prepared hardware context 560 is waiting for the flag 534 in shared memory 530, the signal handling context may spin on a memory location, wait using a special instruction (such as an MWait instruction for an x86 processor) or execute another instruction or operation. In this manner, a context switch may be activated by letting a hardware device 510 write to a specific memory location to signal an event instead of raising a hardware interrupt.

Such a context switch may be used, for example, for user-level drivers. Among other things, user-level drivers are slower than kernel-level pendants as device interrupts are conventionally first routed through the kernel, requiring an additional system-level entry and exit. With fast context switching using additional hardware contexts, this transition is not needed.

Figure 6:
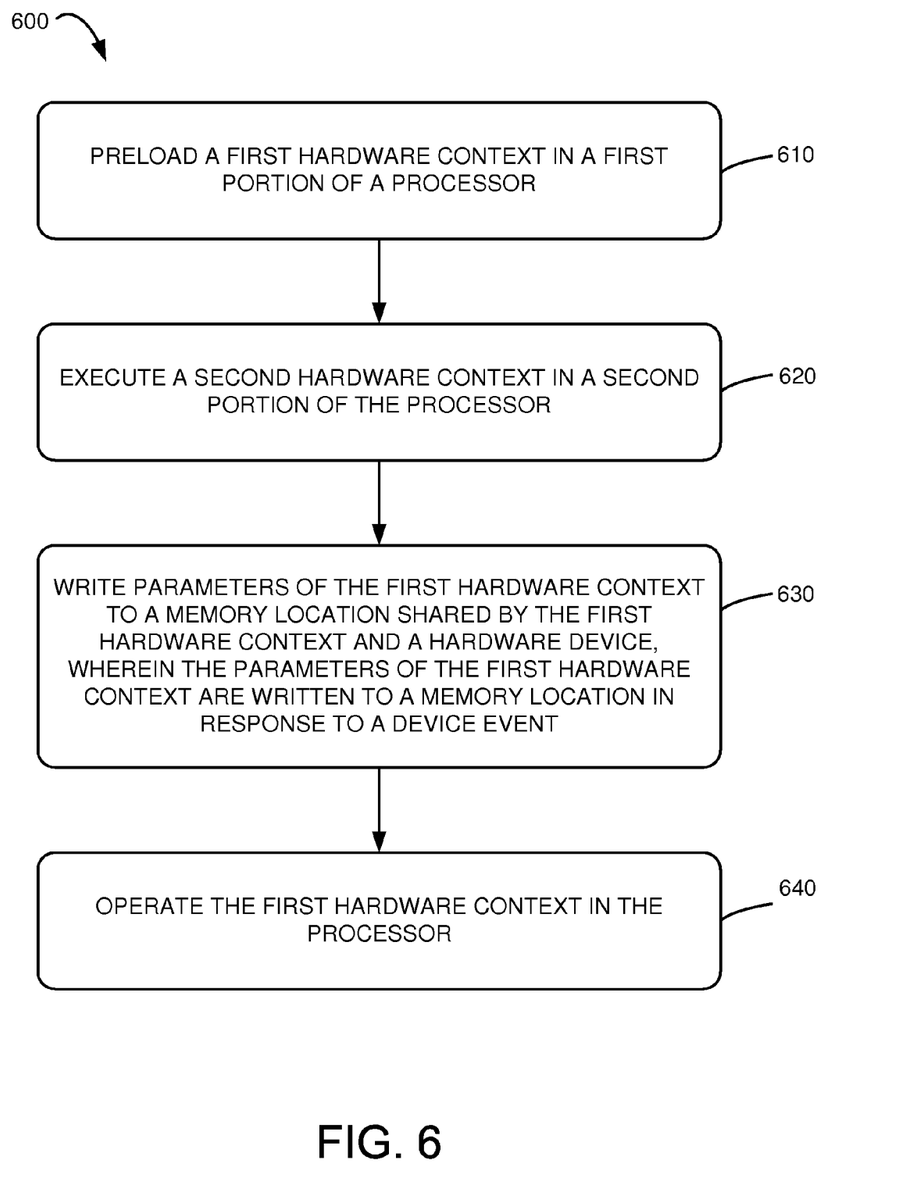
FIG. 6 shows a process flow depicting an embodiment of a method for utilizing a fast context switch in a device interrupt environment.

FIG. 6 depicts an embodiment of a method for utilizing a fast context switch in a device interrupt environment such as that shown in FIG. 5. In block 610, method 600 preloads a first hardware context in a first portion of a processor. In block 620, a second hardware context is executed in a second portion of the processor. Next, method 600 writes parameters of the first hardware context to a memory location shared by a hardware device and the first hardware context wherein the writing parameters of the first hardware context to a memory location is in response to an event from the device in block 630. Then in block 640, the method operates the first hardware context in the processor.

Some embodiments may have the pre-loaded first hardware context waiting for a context switch by spinning a handler of the first hardware context on a memory location until the first hardware context parameters are written to the memory location. In some embodiments, such as embodiments executed on an Intel x86 processor, the pre-loaded context may use the MWait instruction in the first hardware context until the first hardware context parameters are written to the memory location. More generally, a first hardware context in the first portion of the processor further may use an instruction to alert and hold the first hardware context until the first hardware context parameters are written to the memory location. Any suitable interrupt may be handled in this manner. Examples include, but are not limited to, a signal of the arrival of network packets, a signal of the successful transmission of network packets, the completion of a disc block read or write, and error conditions.

While described herein in the context of a system call, a virtual machine, or an interrupt context switch, it will be appreciated that the concepts disclosed herein may be used in any suitable context switching, including but not limited to other hyperthreaded environments and multiple-core environments using full discrete processing cores. Furthermore, while the multiple contexts of each embodiment are shown herein as being located on the same device, it will be understood that these components may comprise separate components, modules, programs or other entities running on multiple devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing a virtual machine context switch, the method comprising:

executing a guest virtual machine having a guest virtual machine context in a second position of a processor;

spinning a handler of a host virtual machine having a host virtual machine context on a memory location until a flag is written to a shared memory location, the shared memory location being shared by the host virtual machine and the guest virtual machine;

in response to the guest virtual machine writing a request for the host virtual machine context by loading corresponding parameters to the shared memory location, preloading the host virtual machine context in a first portion of the processor; and in response to the flag being written to the shared memory location, operating the host virtual machine in the first portion of the processor using the preloaded host virtual machine context.

2. The method of claim 1, wherein the processor is a hyperthreaded processor.

3. The method of claim 1, wherein preloading the host virtual machine context in the first portion of the processor further comprises:
spinning the handler of the host virtual machine context on the shared memory location until the host virtual machine request is written to the memory location.

4. The method of claim 1, wherein preloading the host virtual machine context in the first portion of the processor further comprises:
using an MWait instruction in the host virtual machine context until the host virtual machine request is written to the shared memory location.

5. The method of claim 1, wherein preloading the host virtual machine context in the first portion of the processor further comprises:
using an instruction to alert the host virtual machine context that the host virtual machine request is written to the shared memory location.

6. The method of claim 1, wherein the request of the host virtual machine context is a device request from an enlightened partition to a driver partition.

7. The method of claim 1, wherein the request of the host virtual machine context is a non-device request.

8. The method of claim 1, further comprising:
performing a context switch between two guest virtual machines.

9. The method of claim 1, further comprising:
performing a context switch from a host virtual machine to a guest virtual machine.

10. A computer-readable storage medium excluding signals for providing a virtual machine context switch, bearing computer-readable instructions that, when executed on a computer, cause the computer to perform operations comprising:
executing a guest virtual machine having a guest virtual machine context in a second portion of a processor;
spinning a handler of a host virtual machine having a host virtual machine context on a memory location until a flag is written to a shared memory location, the shared memory location being shared by the host virtual machine and the guest virtual machine;
in response to the guest virtual machine writing a request for the host virtual machine context by loading corresponding parameters to the shared memory location, preloading the host virtual machine context in a first portion of the processor; and
in response to the flag being written to the shared memory location, operating the host virtual machine in the first portion of the processor using the preloaded host virtual machine context.

11. The computer-readable storage medium excluding signals of claim 10, wherein the processor is a hyperthreaded processor.

12. The computer-readable storage medium excluding signals of claim 10, wherein preloading the host virtual machine context in the first portion of the processor further comprises:
spinning the handler of the host virtual machine context on the memory location until the host virtual machine request is written to the shared memory location.

13. The computer-readable storage medium excluding signals of claim 10, wherein preloading the host virtual machine context in the first portion of the processor further comprises:
using an MWait instruction in the host virtual machine context until the host virtual machine request is written to the shared memory location.

14. The computer-readable storage medium excluding signals of claim 10, wherein preloading the host virtual machine context in the first portion of the processor further comprises:
using an instruction to alert the host virtual machine context that the host virtual machine request is written to the shared memory location.

15. The computer-readable storage medium excluding signals of claim 10, wherein the request of the host virtual machine context is a device request from an enlightened partition to a driver partition.

16. The computer-readable storage medium excluding signals of claim 10, wherein the request of the host virtual machine context is a non-device request.

17. The computer-readable storage medium excluding signals of claim 10, further bearing computer-readable instructions that, when executed on the computer, cause the computer to perform operations comprising:
performing a context switch between two guest virtual machines.

18. The computer-readable storage medium excluding signals of claim 10, further bearing computer-readable instructions that, when executed on the computer, cause the computer to perform operations comprising:
performing a context switch from a host virtual machine to a guest virtual machine.

19. A system for providing a virtual machine context switch, comprising:
a processor; and
a memory communicatively coupled to the processor when the system is operational, the
memory bearing processor-executable instructions that, when executed on the processor, cause the system to at least:
execute a guest virtual machine having a guest virtual machine context in a second portion of a processor;
spin a handler of a host virtual machine having a host virtual machine context on a memory location until a flag is written to a shared memory location, the shared memory location being shared by the host virtual machine and the guest virtual machine;
in response to the guest virtual machine writing a request for the host virtual machine context by loading corresponding parameters to the shared memory location, preload the host virtual machine context in a first portion of the processor; and
in response to the flag being written to the shared memory location, operate the host virtual machine in the first portion of the processor using the preloaded host virtual machine context.

20. The system of claim 19, wherein the instructions that, when executed on the processor, cause the system to preload the host virtual machine context in the first portion of the processor, further cause the system to:
spin the handler of the host virtual machine context on the memory location until the host virtual machine request is written to the shared memory location.

* * * * *